July 10, 1956 J. FISHER 2,753,651
METHOD OF MANUFACTURING ARTIFICIAL FISH BAIT
Original Filed Aug. 9, 1951 4 Sheets-Sheet 1
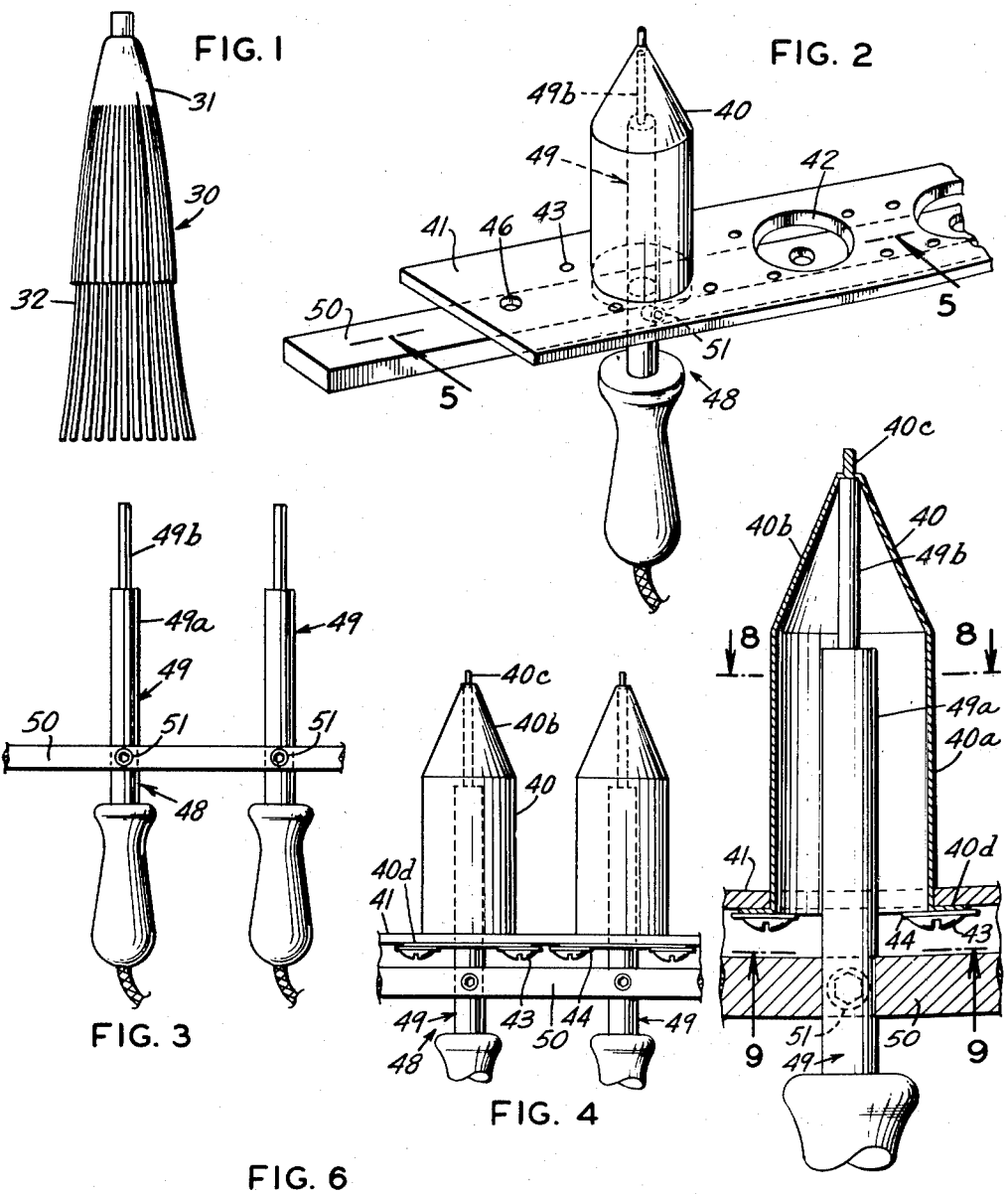
*INVENTOR.*
JESSE FISHER
ATTORNEYS July 10, 1956  J. FISHER  2,753,651
METHOD OF MANUFACTURING ARTIFICIAL FISH BAIT
Original Filed Aug. 9, 1951  4 Sheets-Sheet 2

INVENTOR.
JESSE FISHER
BY
Mason, Kolehmainen, Rathburn & Wyss
ATTORNEYS

July 10, 1956   J. FISHER   2,753,651
METHOD OF MANUFACTURING ARTIFICIAL FISH BAIT
Original Filed Aug. 9, 1951   4 Sheets-Sheet 3

INVENTOR.
JESSE FISHER
BY
ATTORNEYS

July 10, 1956  J. FISHER  2,753,651
METHOD OF MANUFACTURING ARTIFICIAL FISH BAIT
Original Filed Aug. 9, 1951  4 Sheets-Sheet 4

*INVENTOR.*
JESSE FISHER
BY
ATTORNEYS

United States Patent Office 2,753,651
Patented July 10, 1956

2,753,651

METHOD OF MANUFACTURING ARTIFICIAL FISH BAIT

Jesse Fisher, Long Beach, N. Y., assignor, by mesne assignments, to George F. Meyer, Medford, Wis.

Original application August 9, 1951, Serial No. 241,014, now Patent No. 2,686,382, dated August 17, 1954. Divided and this application February 4, 1954, Serial No. 409,490

2 Claims. (Cl. 43—42.53)

The present invention relates to an improved method of manufacturing an artificial fish bait, and more particularly to an improved method of manufacturing a "buck tail," "skirt" or "fly" for use on fish baits either in association with the body of the bait or merely applied loosely to an ordinary fish hook and on smaller baits as a fly. This application is a division of application Serial No. 241,014, filed August 9, 1951, now Patent 2,686,382, granted August 17, 1954.

So-called "buck tails," "skirts," "tassels" or the like which comprise a fringed rubber-like member have been extensively sold both for use with larger baits or directly in association with hooks. They have been manufactured in various colors and designed to permit ready interchangeability. Unfortunately in the manufacture of such devices heretofore the process involved has been very expensive and the article has not been entirely satisfactory for numerous reasons. A common way of manufacturing such buck tails or skirts has comprised adhesively securing to a short sleeve-like member a fringed rubber-like piece of material which is wrapped around the sleeve and secured thereto. The process of manufacturing this type of device is complicated and expensive and moreover there is always the possibility of the adhesive-like material coming undone with the resultant destruction of the "buck-tail" or "fly." It would be desirable to provide a unitary construction where the tubular member which is adapted for association with a hook or bait body is an integral part of the fringe portion and where, if the "buck tail" comprises several skirts, these skirts are united in an integral manner without relying upon cement or other adhesive material to join the two with the possibility of this becoming undone.

It is another object of the present invention to provide an improved process of manufacturing such artificial fish bait in the form of a skirt or buck tail which results in an integral element without the requirement of adhesively securing various parts together.

It is another object of the present invention to provide an improved process of manufacturing artificial fish baits of the above mentioned type and particularly a skirt or buck tail, which resides in a number of simple steps readily adapted to mass production operation with unskilled labor and at very low cost.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings, in which:

Fig. 1 is a top plan view of one embodiment of a double or multiple skirt or buck tail manufactured in accordance with the process of the present invention;

Fig. 2 is a perspective view of portions of certain apparatus used in connection with the process of the present invention.

Fig. 3 is an elevational view further illustrating apparatus shown in Fig. 1 for carrying out a heating step of the present invention;

Fig. 4 is a view similar to Fig. 3 showing the association of certain molds with the heating elements of Fig. 4 to carry out a further step in the process of the present invention;

Fig. 5 is an enlarged sectional view taken on line 5—5 of Fig. 2;

Fig. 6 is a plan view of another element shown in Fig. 2 of the drawings;

Fig. 7 is a plan view of still another element shown in Fig. 2 of the drawings;

Figure 23:
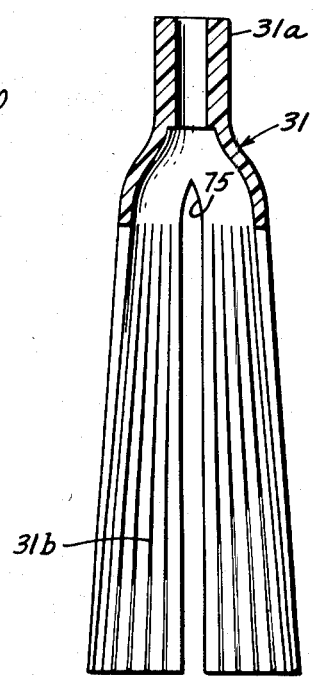
Fig. 23 is an enlarged sectional view through a single skirt or buck tail of the present invention following the completion of the process step illustrated in Fig. 20.

Before describing in detail the process of the present invention, attention is first directed to the buck tail or skirt of the present invention, best shown in Figs. 1 and 23 of the drawings, Fig. 23 showing the single skirt while Fig. 1 shows the double or multiple skirt as obtained by the process steps illustrated in Figs. 24, 25, 26 and 27 once having a plurality of single skirts. In any event the buck tail or double skirt generally designated at 30 in Fig. 1 of the drawings comprises two single skirts 31 and 32 respectively, the skirt of Fig. 23 being designated by the reference numeral 31 to indicate that it may comprise the identical construction of the outer skirt 31 of the double skirt arrangement 30. Preferably these skirts are molded from a plastic material which might comprise a rubber-like material compounded of a powdered polyvinyl chloride-acetate resin, a suitable pigment and a stabilizing agent of some sort. Additionally the material may include a phosphorescent pigment if desired and also a scenting material.

Referring now to Fig. 23, each single skirt section such as 31 is molded as a completely integral unit in the form of a skirt with an integral tubular end 31a of small cross-section and an enlarged flared portion which is cut in the form of a fringe 31b for the skirt or buck tail 31. The details of the construction of the single skirt 31 or the double skirt 30 of the present invention will better be understood following a discussion of the steps of the process of manufacturing the same.

Figure 11:
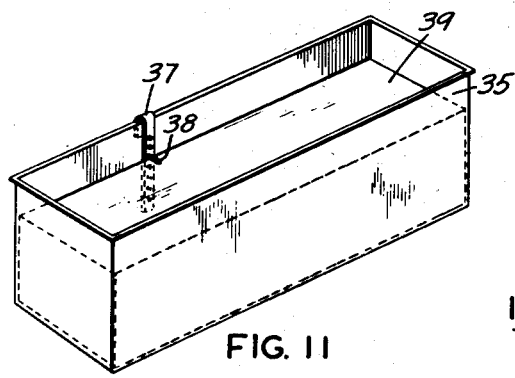
Fig. 11 is a perspective view of a dipping pan or tank used in connection with another step in the process of the present invention.

In accordance with the present invention the plastic material including a suitable pigment is reduced to liquid form and placed in a dipping tank or pan such as 35, shown in Fig. 11 of the drawings. This dipping tank may have any configuration but to accommodate mass production it is preferably of elongated rectangular configuration. A suitable liquid level gage 37 is associated with a tank including a level indicator 38 for indicating the liquid depth. The depth of the liquid, generally designated at 39, in the tank 35 is chosen to determine the length of the skirts manufactured in accordance with the process of the present invention. In carrying out a commercial process embodying the present invention the following dipping material has been employed for making various colored skirts:

*Red skirt*

| Material | Manufacturer's Designation | Quantity, ounces |
| --- | --- | --- |
| Oil | Goodrich Chemical Company's GP-261 Plasticizer. | 40 |
| Stabilizer | Carbide & Carbon Chemicals Co. Stabilizer A-5. | 2 |
| Pigment | Du Pont's "Wachtung Red" | ⅝ |
| Resin | Goodrich Geon | 32 |

For making other colors the amount of oil, stabilizer and resin is constant. However, the quantity of pigment varies substantially. In the case of black, one and one-half ounces of pigment are employed; in the case of yellow, three ounces of pigment are employed; and in the case of a fluorescent white material, ten ounces of the pigment are employed. This dipping mixture, designated as 39 in Fig. 11 of the drawings, remains liquid at room temperatures. It should be understood that the above formulas are by way of example only.

For the purpose of forming a molded body resulting in a product such as the skirt 31 shown in Fig. 23 of the drawings, there are provided molds, best shown in Figs. 2, 4, 5, 12 and 15 of the drawings, each mold being designated generally by the reference numeral 40. As best shown in Fig. 5 of the drawings, each mold 40 comprises a tubular portion 40a merging into a conical portion 40b and terminating in a small tip 40c at the apex of the conical portion. The opposite open end of the mold 40 is provided with a lateral flange 40d. This mold for a particular commercial process embodying the present invention was of the order of one and three-sixteenths inch in diameter, while the tip 40c had a diameter of the order of 0.140 inch. The tip portion 40c actually is the mold for the collar or neck 31a of the skirt or tail 31 of the present invention, whereas the conical portion 40b forms the junction between the neck or collar 31a of the tail 31 and the main body portion thereof which is formed around the mold portion 40a.

Figure 8:
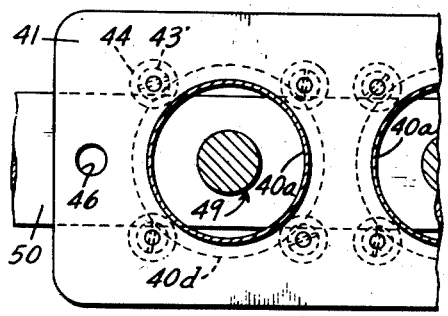
Fig. 8 is a sectional view taken on line 8—8 of Fig. 5, assuming that Fig. 5 shows the complete structure.
Figure 9:
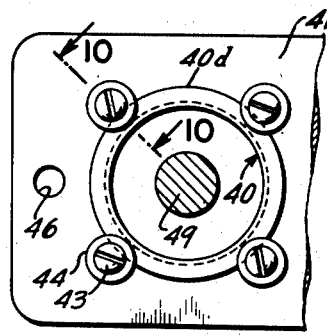
Fig. 9 is a sectional view taken on line 9—9 of Fig. 5, again assuming that Fig. 5 shows the complete structure.
Figure 10:
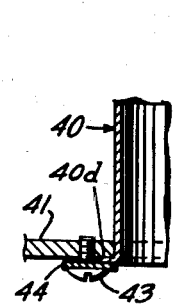
Fig. 10 is a sectional view taken on line 10—10 of Fig. 9.
Figure 12:
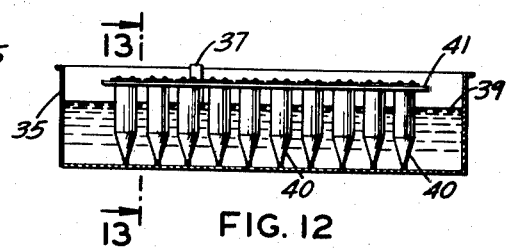
Fig. 12 is a view illustrating a dipping step of the process of the present invention.
Figure 13:
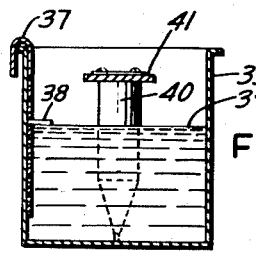
Fig. 13 is a somewhat enlarged sectional view taken on line 13—13 of Fig. 12.
Figure 14:
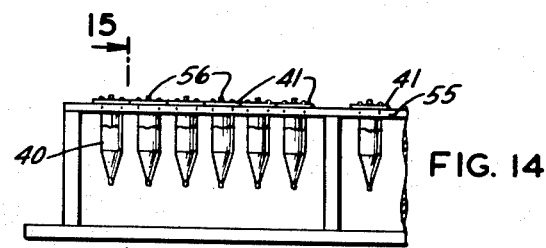
Fig. 14 is a somewhat diagrammatic view illustrating a further step in the process of the present invention.
Figure 15:
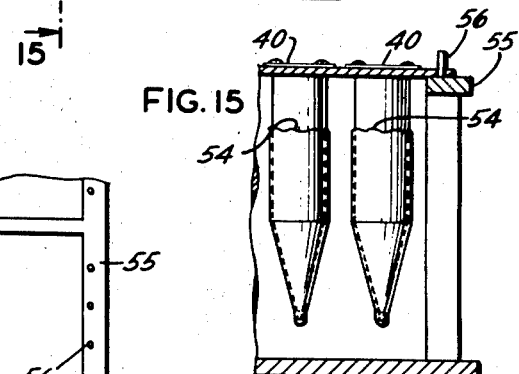
Fig. 15 is an enlarged sectional view taken on line 15—15 of Fig. 14 and showing the molded material thereon following a dipping operation.
Figure 17:
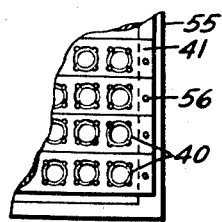
Fig. 17 is a top plan view of a portion of Fig. 14.
Figure 16:
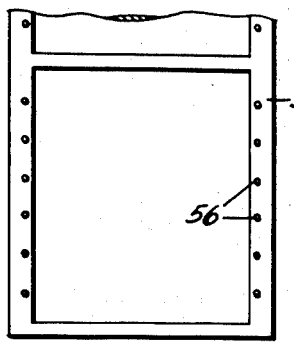
Fig. 16 is a top view of a portion of the apparatus shown in Fig. 14 to carry out the process step of Fig. 14.

Preferably the molds are arranged in clips with a large number associated with each clip, an individual clip being shown in Fig. 2 by the reference numeral 41. In Fig. 12 of the drawings this clip 41 is indicated as supporting ten molds 40, but any number within reason might be supported on a single clip. Preferably the clip is provided with a plurality of openings 42 defined therein of such a size as to receive the main body portion 40a of the molds. Moreover, as is indicated in Fig. 5 of the drawings, the flange portion 40d of each mold 40 engages with one side of the clip and preferably is fastened thereto by suitable screws 43 and washers 44, best shown in Fig. 9 of the drawings, the washers 44 overlapping the peripheral flange 40d and hence clamping the same to the clip. Any other suitable means for supporting a large number of molds 40 in a unit might be resorted to. As illustrated, each clip 41 is provided with an opening 46 at each end thereof for a purpose which will become apparent as the following description proceeds.

In accordance with a further step in the process of the present invention, the molds must be heated in a desired manner before dipping the same into the tank 35 and to this end a suitable heating unit, generally designated at 48 in Fig. 3 of the drawings, is provided. This heating unit may have any configuration and has been specifically illustrated as comprising a plurality of electric heating elements 49 each somewhat in the nature of an electric soldering iron with a peculiar tip construction. As illustrated, each heating element 49 comprises a cylindrical portion 49a and a tip portion of reduced cross-section 49b. These heating elements 49 are mounted on a suitable support such as 50 in a spaced relationship which corresponds exactly to the spacing between the openings 42 in the mold clip 41 and hence to the spacing between the molds 40. Suitable fastening means 51 may be provided individually to support each heating element 49 on the member 50, thereby to provide the heating unit 48 preferably comprising the same number of elements as the number of molds 40 supported on an individual clip 41. It will be understood that this number may vary in any desired manner depending upon the volume of production desired.

For the purpose of heating the molds prior to the dipping step of the present invention, the clip 41 and associated molds 40 are placed on the heating unit 48 in the manner indicated in Figs. 2, 4 and 5 of the drawings. The position of the molds 40 relative to the heating elements 49 is best shown in Fig. 5 of the drawings, and this is an important aspect of the present invention. It should be observed that the portion 49b of each heating element 49 is in direct engagement with a tip 40c so that the greatest heat transfer occurs between the tip 40c and the associated heating element 49. A lesser heat transfer exists between the portion 40b of the mold 40 and the heating element 49 and a still smaller heat transfer occurs between the portion 40a of the mold 40 and the heating element 49. This, as will become apparent from the following description, results in providing the greatest thickness of material where the mold is hottest, namely at the collar 31a of the skirt 31 and a gradually thinner portion of material as the mold is cooler during the dipping operation, since the more heat in the mold the more plastic material from the dipping solution 39 adheres thereto. In a commercial process embodying the present invention, each heating element 49 comprised a modified sixty watt electric soldering iron and the support 50 comprised a metal bar of the order of twenty-six inches long, one-half inch thick and one inch wide. The heating step of the present invention, therefore, comprises placing the clip of molds 40 on the heating unit 48 to preheat the molds in the desired manner with different degrees of heat for different parts of the mold, the greater the heating the thicker the material adhering to the molds during the dipping process.

In accordance with a further step in the process of the present invention, the molds attached to the clip 41 are inverted from the position assumed during the heating operation and are dipped into the dipping tank 35 as indicated in Fig. 12 of the drawings. The tip or pin 40c of the molds is moved into the solution until the bottom of the pan or tank 35 is engaged, as clearly indicated in Fig. 12. This step could be either a hand operation or a mechanical operation. Since as far as the process of the present invention is concerned the hand step is similar to a mechanical operation of a dipping machine, the drawings have been simplified by showing the hand operation rather than the mechanical operation. It should be understood that the depth of the solution 39 in the dipping pan 35 determines the length of the tails and the double skirt 30 shown in Fig. 1 of the drawings is illustrated as comprising skirt or tail portions 31 and 32 of different lengths. The molds 40 are held in the solution for just an instant and the plastic material clings to the outside of the mold with a thickness in proportion to the temperature of the particular mold portion and, as has been pointed out above, a varying thickness of skirt is obtained which is quite clear from an examination of Fig. 23 of the drawings. Actually the depth of dipping will result in the end of the skirt remote from the neck portion 31a to terminate in a rather non-uniform line designated at 54, in Fig. 15 of the drawings.

The plastic material described above requires heat curing at a suitable temperature, and accordingly the mold clips with the dipped material thereon are placed on a suitable curing rack 55, best shown in Figs. 14 to 17 of the drawings. This curing rack preferably comprises a frame having a plurality of pins 56 projecting upwardly therefrom. These pins are adapted to project through the openings 46 in the clips 41 and a large number of clips may be supported in closely spaced relationship on drying or curing racks 55. The curing racks 55 are adapted to be slid into a suitable oven for curing at temperatures suited to the particular length of the skirt and the material employed. In a commercial process embodying the present invention, the long red tails were cured for three minutes and forty-five seconds at a temperature of 390° F. while the short red tails were cured at the same temperature for a period of three and one-half minutes. As far as the black tails are concerned, the long black tails were cured at 400° F. for three and one-half minutes and the short black tails were cured at 370° F. for three and one-fourth minutes. The long yellow tails were cured at 395° F. for three minutes and fifteen seconds, while the short yellow tails were cured at 390° F. for three minutes and fifteen seconds. The fluorescent white tails were cured at 370° F. for four minutes and seven seconds, while the short fluorescent white tails were cured at 370° F. for four minutes. These temperatures and times permit of some variation but the above have been found to be especially satisfactory for the particular dipping material employed and the size of the tails employed.

Figure 18:
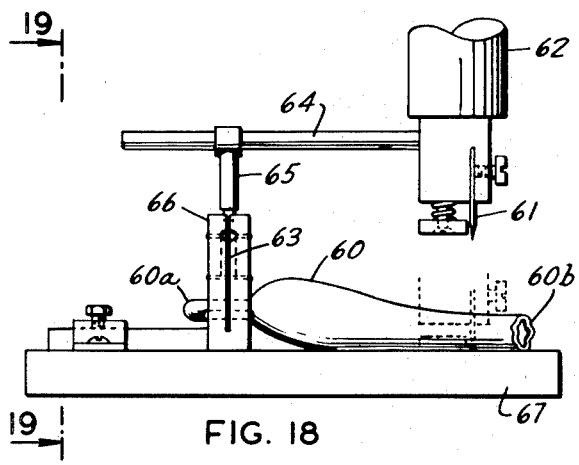
Fig. 18 is an elevational view illustrating a further step in the process of the present invention.

Upon completion of the curing operation the racks are removed from the oven and the molded material contained on the molds which effectively are integral skirt or tail blanks are peeled off and have a configuration somewhat represented by the construction shown in Fig. 18 of the drawing and designated by the reference numeral 60. The tip or collar end of each tail is closed as indicated at 60a and the skirt end 60b has an irregular or non-uniform end.

Figure 19:
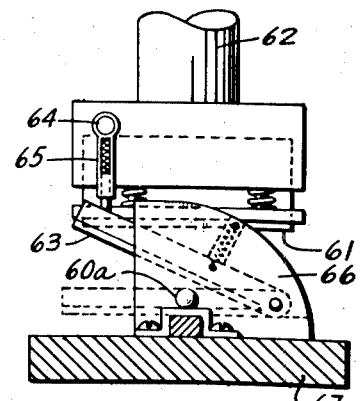
Fig. 19 is a sectional view taken on line 19—19 of Fig. 18.

In accordance with a further step in the process of the present invention, the skirt blanks 60 are cut to proper length by suitable means such as is shown in Figs. 18 and 19, for example. As there illustrated, a skirt end cutting knife 61 is mounted on a suitable reciprocating member 62 of a press or similar apparatus. A collar end cutting knife 63 is also simultaneously actuated by the downward movement of member 62. To this end the collar end cutting knife 63 is preferably actuated by a rod 64 and attached pin member 65 which latter is adjustably positioned for any desired skirt length. Preferably also the collar end cutting portion of the unit shown in Figs. 18 and 19 is provided with a suitable support 66 having an opening defined therein for receiving the collar end 60a. As is clearly indicated in Figs. 18 and 19, the cutting knives cut into a cutting board 67 which might comprise a wood cutting board. By adjusting the spacing between the collar and tail end cutting knives 63 and 61 respectively, any suitable skirt length such as two and one-half inches, three inches or the like, may be obtained, and upon actuation of the arbor press the tail is cut off at both ends simultaneously to provide a desired length and to provide a neck or collar which has a sleeve-like configuration and which is open at the end, as clearly shown in Fig. 23 of the drawings, while at the same time cutting the other end of the skirt so that when the fringing operation is performed the fringes will be of uniform length.

Figure 20:
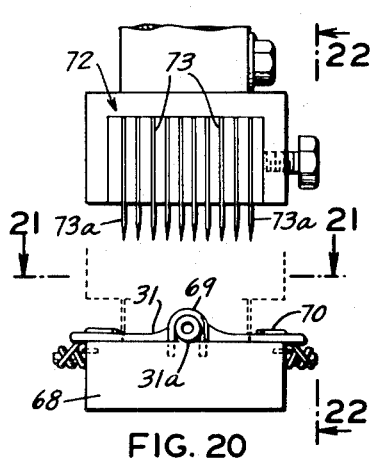
Fig. 20 is a view illustrating a further step in carrying out the process of the present invention.
Figure 21:
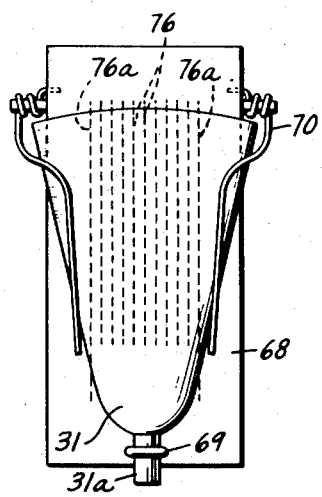
Fig. 21 is a view looking in the direction of the arrows 21—21 of Fig. 20 illustrating more details of the process step shown in Fig. 20 and also showing by dashed lines the positions which the slitting knives assume during the process step shown in Fig. 20.
Figure 22:
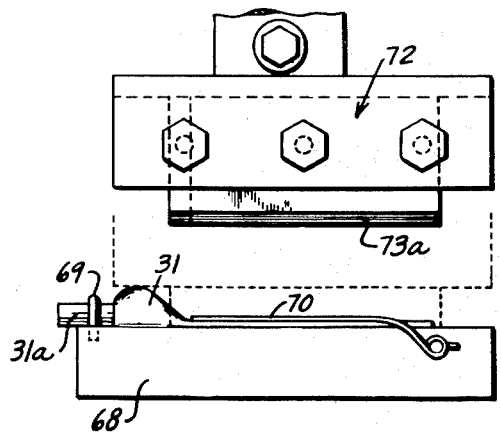
Fig. 22 is a view looking in the direction of the arrows 22—22 of Fig. 20.
Figure 24:
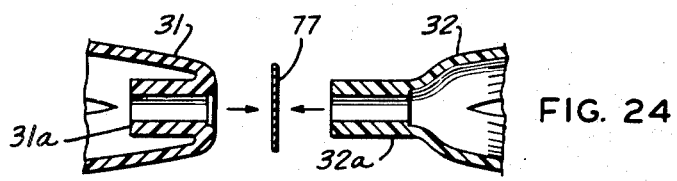
Figs. 24, 25, 26 and 27 are views illustrating the final steps in the manufacture of the multiple buck tail or skirt shown in Fig. 1 of the drawings.
Figure 25:
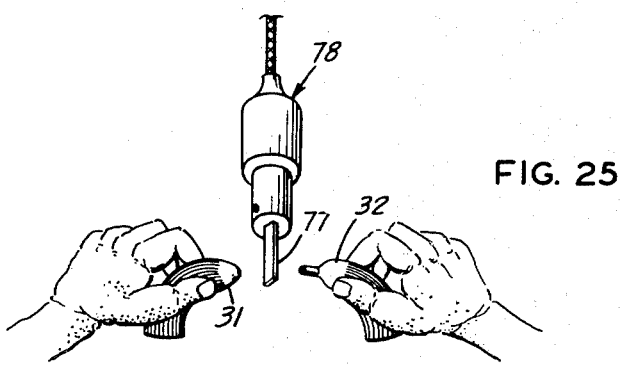
Figure 26:
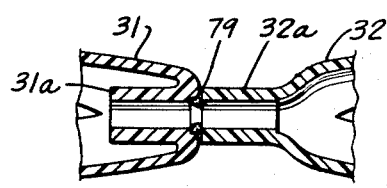
Figure 27:
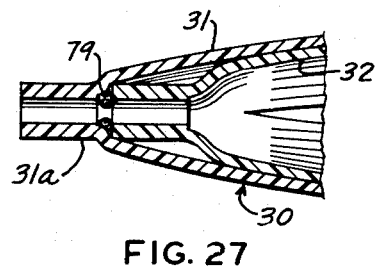

The next step in the process of the present invention comprises slitting or fringing the skirt as shown in Figs. 20 to 22 of the drawings. As best shown in Figs. 20 to 22 of the drawings, each non-slitted skirt or tail with the ends cut off designated as 31 in Fig. 21 to relate it to the completed skirt of Fig. 23 is mounted on a suitable skirt slitting board 68 which is provided with a U-shaped skirt collar holding fixture 69 and a pair of tail holding fixtures 70 disposed on either side of the slitting board 68. The collar 31a of the skirt 31 is inserted in the holder 69 and the clips 70 spread the skirt apart as indicated in Fig. 21 and somewhat flatten the same so that a suitable slitting knife, generally designated at 72, may provide the fringed construction. The slitting knife 72 preferably comprises a construction capable of receiving in spaced parallel relationship a large number of razor blades 73. In a commercial embodiment these razor blades were of the order of four and one-half inches long and were spaced to give the desired fringe or tassel width. The outside knives, designated as 73a in Fig. 20 of the drawings, are longer than the knives interposed therebetween so as to cut away the side portions of the skirt and provide the configuration best shown at 75 in Fig. 23 of the drawings. The actual cut performed by the cutting knives 73 is shown by dashed lines in Fig. 21 designated as 76a for the two long outside cuts and 76 for the rest. Upon completion of the process step embodied in Figs. 20 to 22 of the drawings, the skirt 31 is complete and is of a length desired depending upon the choice of liquid depth in the dipping tank 35 and the set of the cutting fixture in Fig. 18 of the drawings.

Should it be desired to make the double or multiple tail 30, shown in Fig. 1 of the drawings, a further step in the process is necessary. In accordance with the present invention, the outer tail or skirt 31 of Fig. 1 is turned inside out, as clearly shown in Figs. 24 to 27 of the drawings, while the inner tail 32 is maintained in its conventional position. The two skirts or tails 31 and 32 are then moved in the direction of the arrows of Fig. 24 and brought into contacting engagement with a flat heating element 77 which again may comprise a sort of modified soldering iron designated at 78 in Fig. 25 of the drawings. When these elements are touched against the flat blade 77, they are then pushed lightly together in the manner shown in Fig. 26 of the drawings, the hot element 77 causing the parts to become tacky and sticky, thereby becoming integrally joined as indicated at 79 in Figs. 26 and 27 of the drawings with the collar portion 32a of the skirt 32 and the collar portion 31a of the skirt 31 coaxial to confine a sort of integral elongated sleeve made up of both collar or sleeve portions. The skirt 31, which has heretofore been turned inside out, is now turned right side out and becomes the over-tail or outside tail or skirt of the double tail 30 shown in Fig. 1 of the drawings.

From the above discussion it will be apparent that there has been provided an improved process resulting in an improved tail or skirt construction. In the single tail construction, no step of pasting or joining a rubber skirt element to a rubber-like sleeve is involved and an integral construction throughout results. Moreover, in the double tail construction a completely integral double tail arrangement is provided by the process of the present invention. The steps in the process are simple, lend themselves very well to mass production with automatic machinery and more or less foolproof results are obtained. The improved skirt or tail of the present invention may be slipped onto any hook to provide in itself a bait, and the flexible collar or sleeve 31a integral with the skirt portion permits of readily interchanging different sizes and colors of skirts as the occasion requires, thereby providing a large number of baits with an assortment of buck tails. However, if desired, the improved skirt or tail of the present invention may be associated with a large number of baits to serve as a sort of fly or tail for these baits.

While there has been illustrated and described an improved process of manufacturing the skirt or tail, it will be obvious that various modifications will occur to those skilled in the art, and it is aimed in the appended claims to cover all such changes and modifications as fall within the true spirit and scope of the present invention.

What is claimed as new and desired to be secured by Letters Patent of the United States is:

1. The process of making a buck tail or skirt which comprises dipping to a predetermined depth a heated hollow mold having a short rod-like extension at one end into a liquid resin whereby the liquid adheres to said mold with a thickness dependent upon the temperature of the mold, curing said adhering material while on said mold at an elevated temperature for a predetermined period whereby it comprises a skirt blank of rubber-like material having an integral sleeve or collar at the end determined by said rod-like extension, peeling said skirt blank from said mold, cutting off both ends of said blank, flattening the portion of said blank remote from said integral sleeve and slitting said flattened portion of said blank to provide a fringed buck tail with an integral sleeve or collar portion.

2. The process of making a multiple skirt for use as an artificial fish bait which comprises dipping to a predetermined depth a heated hollow mold into a liquid of a plastic material whereby the liquid adheres to said mold with a thickness dependent upon the temperature of the mold, curing said adhering material while on said mold at an elevated temperature for a predetermined period whereby it comprises a skirt blank of rubber-like material, peeling said skirt blank from said mold, cutting off both ends of said blank, slitting one end of said blank to provide a fringed buck tail with an integral sleeve or collar portion, partially turning one buck tail inside out, integrally uniting said one buck tail with another buck tail, and then turning said one buck tail right side out to provide an integral multiple skirt.

References Cited in the file of this patent

UNITED STATES PATENTS

| | | |
|---|---|---|
| 1,748,636 | Crockett | Feb. 25, 1930 |
| 2,054,605 | Rogers | Sept. 15, 1936 |
| 2,111,020 | Arbogast | Mar. 15, 1938 |
| 2,238,292 | Schavey | Apr. 15, 1941 |

FOREIGN PATENTS

| | | |
|---|---|---|
| 591,611 | Great Britain | Aug. 22, 1947 |
| 927,827 | France | May 12, 1947 |